US008073855B2

(12) United States Patent
Nagoya

(10) Patent No.: US 8,073,855 B2
(45) Date of Patent: Dec. 6, 2011

(54) COMMUNICATION CONTROL DEVICE AND COMMUNICATION CONTROL SYSTEM

(75) Inventor: Mitsugu Nagoya, Tokyo (JP)

(73) Assignee: Duaxes Corporation, Chiyoda-ku, Tokyo (JP)

( * ) Notice: Subject to any disclaimer, the term of this patent is extended or adjusted under 35 U.S.C. 154(b) by 63 days.

(21) Appl. No.: 11/910,240

(22) PCT Filed: Mar. 28, 2005

(86) PCT No.: PCT/JP2005/005789
§ 371 (c)(1),
(2), (4) Date: Dec. 27, 2007

(87) PCT Pub. No.: WO2006/103743
PCT Pub. Date: Oct. 5, 2006

(65) Prior Publication Data
US 2009/0132509 A1    May 21, 2009

(51) Int. Cl.
*G06F 7/00* (2006.01)
(52) U.S. Cl. . 707/754; 707/922; 707/959; 707/999.009; 714/731; 713/154; 709/204; 709/217; 709/223
(58) Field of Classification Search .................. 707/754, 707/922, 959, 999.009; 713/154; 709/204–208, 709/217–219, 223–224
See application file for complete search history.

(56) References Cited

U.S. PATENT DOCUMENTS

| 4,475,237 A | 10/1984 | Glasby ........................... 382/181 |
| 5,341,479 A | 8/1994 | Dean et al. ........................ 711/4 |
| 5,802,065 A | 9/1998 | Ogawa et al. |
| 5,951,651 A * | 9/1999 | Lakshman et al. ............. 709/239 |
| 5,956,336 A | 9/1999 | Loschke et al. ................ 370/392 |
| 6,185,552 B1 | 2/2001 | DeLong et al. .................... 707/3 |
| 6,236,678 B1 | 5/2001 | Horton et al. ................... 375/222 |
| 6,278,995 B1 * | 8/2001 | Hawkinson ........................ 707/4 |
| 6,341,130 B1 * | 1/2002 | Lakshman et al. ............. 370/389 |
| 6,631,466 B1 | 10/2003 | Chopra et al. |
| 6,697,806 B1 * | 2/2004 | Cook ............................... 707/10 |

(Continued)

FOREIGN PATENT DOCUMENTS

JP    04-180425    6/1992

(Continued)

OTHER PUBLICATIONS

Chinese Office Action for Chinese Application No. 200580049496.0, mailed on Jan. 9, 2009 (8 pages).

(Continued)

*Primary Examiner* — Cheyne D Ly
(74) *Attorney, Agent, or Firm* — Ladas & Parry, LLP

(57) ABSTRACT

The present invention provides a technique for enabling a high-speed communication control apparatus.

A packet processing circuit of a communication control apparatus includes a user database, a virus list, a whitelist, a blacklist and a common category list. Upon acquisition of a request for access to a content, matching between information on a user who has sent the access request and the user database is performed by a search circuit, so as to authenticate the user. When the user is authenticated, the search circuit performs matching between the URL of the content to be accessed and the virus list, whitelist, blacklist and common category list. A process execution circuit controls the permission for the access based on the search result of the search circuit and determination conditions stored in a second database. The packet processing circuit is configured with a wired logic circuit.

10 Claims, 15 Drawing Sheets

U.S. PATENT DOCUMENTS

| | | | | |
|---|---|---|---|---|
| 7,454,418 B1 * | 11/2008 | Wang | ................... | 707/999.006 |
| 2005/0060535 A1 * | 3/2005 | Bartas | ........................ | 713/154 |

FOREIGN PATENT DOCUMENTS

| | | |
|---|---|---|
| JP | 09-181791 | 7/1997 |
| JP | 2000-250737 | 9/2000 |
| JP | 2001-168911 | 6/2001 |
| JP | 2003-280988 | 10/2003 |
| JP | 2004-030678 | 1/2004 |
| JP | 2004-140618 | 5/2004 |
| JP | 2004-172917 | 6/2004 |
| JP | 2004-187201 | 7/2004 |

OTHER PUBLICATIONS

International Search Report for PCT/JP2005/012605 Mailed Oct. 25, 2005 w/ English Translation (4 Pages).

International Preliminary Report on Patentability (Chapter 1 of the Patent Cooperation Treaty) for International Application No. PCT/JP2005/012605, Dated Aug. 21, 2007 w/ English Translation Thereof (8 Pages).

Japanese Office Action for Japanese Application No. 2007-503569, Mailed on Mar. 20, 2007, W/ English Translation Thereof (4 Pages).

Japanese Office Action for Japanese Application No. 2007-503569, Mailed on Oct. 16, 2007 (4 Pages).

Office Action in Japanese Patent Application No. 2007-503569, w/ English Translation, Mailed Jan. 29, 2008 (6 Pages).

Patent Abstracts of Japan, Publication No. 2005-018942, Publication Date Jan. 20, 2005 (1 Page).

Patent Abstracts of Japan, Publication No. 2004-164435, Publication Date Jun. 10, 2004 (1 Page).

Patent Abstracts of Japan, Publication No. 2003-169044, Publication Date Jun. 13, 2003 (1 Page).

Korean Office Action for Korean Application No. 10-2007-7008755, mailed on Jul. 29, 2008 (8 pages).

Japanese Office Action for Japanese Application No. 2007-106290, mailed on Jun. 17, 2008 (7 pages).

Patent Abstracts of Japan for Japanese Publication No. 11-232279, Publication date Aug. 27, 1999 (1 page).

Patent Abstracts of Japan, Publication No. 2001-282797, Publication Date: Oct. 12, 2001, 1 page.

Japanese Office Action for Japanese Patent Application No. 2007-505311, issued Jun. 5, 2007, and English translation thereof 6 pages.

Fortinet, Inc., Delivering Complete Network Protection Using Advanced Content Processing Technology, whitepapers. techrepublic.com.com, May 2002, FortiNet Inc., Palo Alto, CA, USA, 19 pages.

Japanese Office Action for Japanese Patent Application No. 2007-505311, Issued Aug. 21, 2007, and English translation thereof, 4 pages.

PCT International Preliminary Report on Patentability and Written Opinion of The International Searching Authority, for International Application No. PCT/JP2005/005789, Issued on Oct. 3, 2007, and English Translation thereof, 10 pages.

Canadian Office Action for Canadian Application No. 2,603,106, mailed on Jun. 27, 2008 (2 page).

U.S. Office Action of Dec. 28, 2010 for U.S. App. No. 11/793,565.

* cited by examiner

FIG.10

| 62 | 64 |
|---|---|
| MATCHED | PERMIT |
| NOT MATCHED | DISCARD |

| 62 | 64 |
|---|---|
| 0 | PERMIT |
| 3 | DISCARD |
| 4 | REPLACEMENT |
| 7 | ROUTING |
| 8 | SWITCHING |
| ⋮ | ⋮ |

| CATEGORY NO. | URL | TITLE |
|---|---|---|
| 0 | http://www.xxx.xxx/x5.html | X X X |
| 0 | http://www.xx.xx/ | X X X |
| ⋮ | ⋮ | ⋮ |

161

(b)

| CATEGORY NO. | URL | TITLE |
|---|---|---|
| 1 | http://www.xxx.com/xxx.html | RANKING |
| 1 | http://www.x.co.jp/ | QUESTIONNAIRE |
| ⋮ | ⋮ | ⋮ |

162

(c)

| CATEGORY NO. | URL | TITLE |
|---|---|---|
| 3 | http://www.xxx.com/x/1.html | CRIME |
| 4 | http://www.xxx.com/x/2.html | CRIME |
| ⋮ | ⋮ | ⋮ |

| CATEGORY NO. | URL | TITLE |
|---|---|---|
| 1 | http://www.xxx/x.html | TRAVEL |
| 1 | http://www.xxx/a.html | TICKETS |
| ⋮ | ⋮ | ⋮ |
| 1 | http://www.xxx.xxx/1.html | HOT SPRING |
| 2 | http://www.xxx.com/ | MOVIES |
| 2 | http://www.x.co.jp/r.html | RECOMMENDED |
| ⋮ | ⋮ | ⋮ |
| 2 | http://www.x.co.jp/1/x/ | REVIEW |
| 3 | http://www.xxx.com/x/1.html | CRIME |
| 3 | http://www.xxx/x/1.html | VIOLENCE |
| ⋮ | ⋮ | ⋮ |

FIG.15

(a) VIRUS LIST — MATCHED (62) | PROHIBIT (64)

(b) WHITELIST — MATCHED (62) | PERMIT (64)

(c) BLACKLIST — MATCHED (62) | PROHIBIT (64)

(d) COMMON CATEGORY LIST

| USER ID (168) | CATEGORY (169) | | | | | | |
|---|---|---|---|---|---|---|---|
| | 1 | 2 | 3 | 4 | 5 | ...... | 57 |
| 000001 | ○ | × | × | ○ | ○ | ...... | × |
| 000002 | ○ | ○ | × | × | ○ | ...... | ○ |
| 000003 | ○ | ○ | × | ○ | × | ...... | ○ |
| ⋮ | ⋮ | ⋮ | ⋮ | ⋮ | ⋮ | ⋮ | ⋮ |

60

COMMUNICATION CONTROL DEVICE AND COMMUNICATION CONTROL SYSTEM

TECHNICAL FIELD

The present invention relates to a communication control technique, particularly to a communication control apparatus and a communication control system for controlling the permission for access to a content that is stored in a position accessible via a network.

BACKGROUND ART

Due to improved Internet infrastructures and the widespread of communication terminals, such as cellular phone terminals, personal computers, and VoIP (Voice over Internet Protocol) phone sets, the number of Internet users is now exploding. Under such circumstances, security problems such as computer viruses, hacking and spam mails have become apparent, requiring appropriate techniques for communication control.

The Internet has enabled easy access to a vast amount of information. On the other hand, harmful information is proliferating thereon and regulation on its originator does not keep up with the proliferation. To provide an environment where everyone can use the Internet safely and effectively, there is required an appropriate technique for controlling access to harmful contents.

For example, there has been proposed an access control technique in which are prepared databases containing lists of sites to which access is permitted or prohibited, forbidden keywords or useful keywords, so as to control access to external information via the Internet with reference to such databases (see Patent Document 1, for example).

[Patent Document 1] Japanese Patent Application Laid-open No. 2001-282797.

DISCLOSURE OF INVENTION

Problem to be Solved by the Invention

If communication control as disclosed in the Patent Document 1 is performed, since improved communication environments have enormously increased communication traffic in recent years, longer time may be required for access due to a bottleneck of matching with a database for determining access permission. In order to avoid such an instance, there is required a communication control apparatus that enables high-speed processing of a large volume of data.

The present invention has been made in view of such a situation, and a general purpose thereof is to provide a technique for enabling a high-speed communication control apparatus.

Means for Solving the Problem

One aspect of the present invention relates to a communication control apparatus. The communication control apparatus comprises: a memory unit which stores reference data to be referred to when determining the permission for access to a content stored in a position accessible via a network; a search unit which acquires communication data for requesting access to the content and searches the communication data for the reference data; and a processing unit which controls access to the content based on the result of the search, wherein the search unit is configured with a wired logic circuit.

Since the search unit that performs processing for determining access permission is provided as a dedicated hardware circuit configured with a wired logic circuit, the processing speed can be improved. Accordingly, access control can be appropriately performed with minimal effect on the traffic.

The search unit may search information indicating the position of a content to be accessed in the communication data, for the reference data. The information indicating the position of a content may be a URL (Uniform Resource Locator), for example.

The memory unit may include a plurality of databases storing the reference data. Also, the search unit may include, with respect to each of a plurality of the databases, a search circuit which searches the communication data for the reference data stored in the database. A plurality of the search circuits may then perform searches on a plurality of the databases in parallel. Consequently, the search speed can be improved.

Also, priorities of the plurality of databases may be defined. When a plurality of the search circuits perform searches on a plurality of the databases in parallel and consequently a plurality of pieces of reference data included in a plurality of the databases are found, a search result with the highest priority may be employed. Accordingly, even when the priorities are defined, searches can be performed simultaneously in parallel, thereby improving the search speed.

The database may store data indicating the position of a content to which access is permitted. Also, the database may store data indicating the position of a content to which access is prohibited. Further, the database may store data indicating the position of a content containing a computer virus to which access is prohibited. The database may store data in which the permission or prohibition of access to a content belonging to a category is determined by a user, with respect to each category.

Another aspect of the present invention relates to a communication control system. The communication control system comprises: any one of the communication control apparatuses stated above; and a server apparatus which is connected to the communication control apparatus and controls the operation of the communication control apparatus. Since a communication control apparatus configured with a wired logic circuit is controlled by a peripheral server apparatus, the communication control apparatus can perform various functions, thereby enabling a highly flexible system.

Optional combinations of the aforementioned constituting elements, and implementations of the invention in the form of methods, apparatuses, systems, recording mediums and computer programs may also be practiced as additional modes of the present invention.

Advantageous Effects

The present invention provides a technique for enabling a communication control apparatus capable of high-speed processing.

BRIEF DESCRIPTION OF THE DRAWINGS

FIG. 10 is a diagram that shows an example of internal data of a second database.

FIG. 11 is a diagram that shows another example of internal data of the second database.

FIG. 13A is a diagram that shows an example of internal data of a virus list; FIG. 13B is a diagram that shows an example of internal data of a whitelist; and FIG. 13C is a diagram that shows an example of internal data of a blacklist.

FIG. 14 is a diagram that shows an example of internal data of a common category list.

FIGS. 15A, 15B, 15C and 15D are diagrams that show examples of internal data of the second database.

EXPLANATION OF REFERENCE NUMERALS

Figure 1:
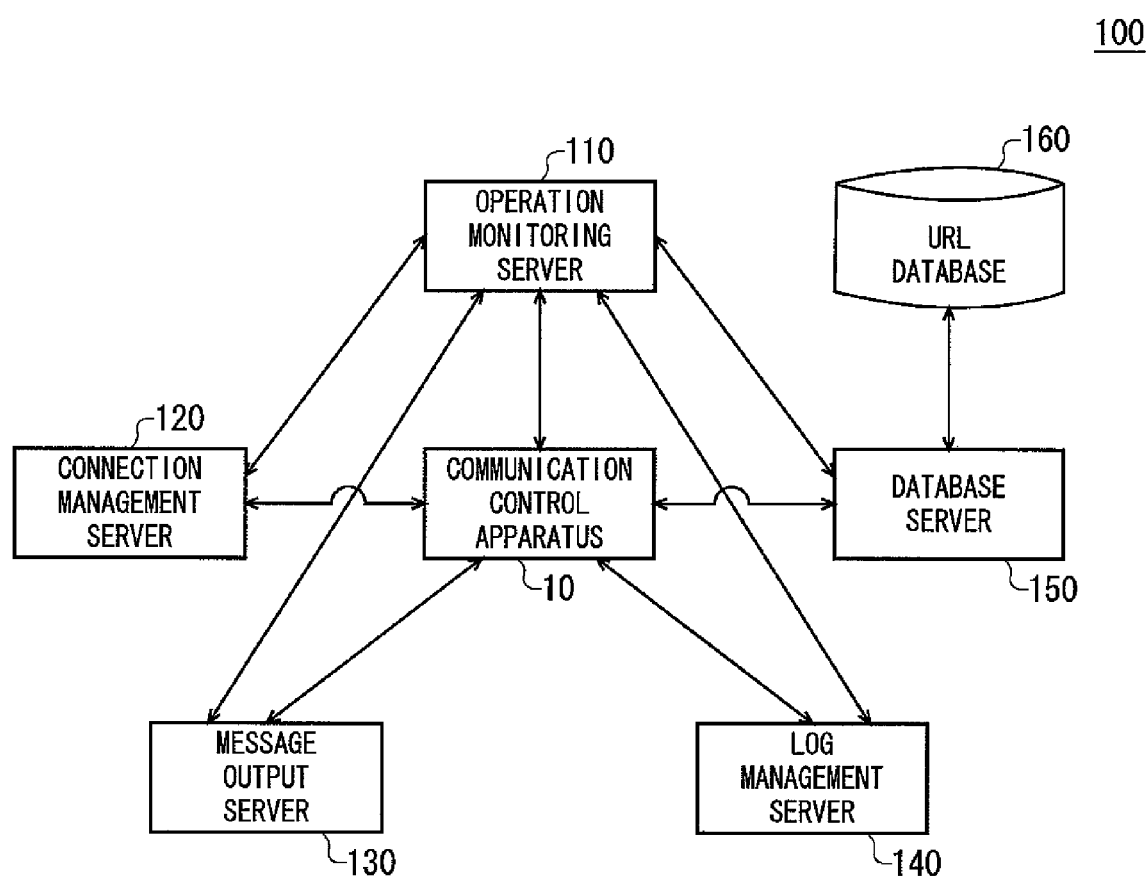
FIG. 1 is a diagram that shows a configuration of a communication control system according to an embodiment.

10 communication control apparatus
20 packet processing circuit
30 search circuit
32 position detection circuit
33 comparison circuit
34 index circuit
35 comparison circuit
36 binary search circuit
40 process execution circuit
50 first database
57 user database
60 second database
100 communication control system
110 operation monitoring server
120 connection management server
130 message output server
140 log management server
150 database server
160 URL database
161 virus list
162 whitelist
163 blacklist
164 common category list

BEST MODE FOR CARRYING OUT THE INVENTION

FIG. 1 shows a configuration of a communication control system according to an embodiment. A communication control system 100 comprises a communication control apparatus 10 and various peripheral apparatuses provided to support the operation of the communication control apparatus 10. The communication control apparatus 10 of the present embodiment performs a URL filtering function provided by an Internet service provider or the like. The communication control apparatus 10 provided on a network path acquires a request for access to a content, analyzes the content, and determines whether or not the access to the content should be permitted.

If the access to the content is permitted, the communication control apparatus 10 will transmit the access request to a server that retains the content. If the access to the content is prohibited, the communication control apparatus 10 will discard the access request and return a warning message or the like to the source of the request. The communication control apparatus 10 of the present embodiment receives an HTTP (HyperText Transfer Protocol) "GET" request message. The apparatus then searches a list of reference data for determining access permission to check if the URL of the content to be accessed appears in the list, so as to determine whether or not the access to the content should be permitted.

The peripheral apparatuses include an operation monitoring server 110, a connection management server 120, a message output server 130, a log management server 140 and a database server 150. The connection management server 120 manages connection to the communication control apparatus 10. When the communication control apparatus 10 processes a packet transmitted from a cellular phone terminal, for example, the connection management server 120 authenticates the user as a user of the communication control apparatus 10, based on information included in the packet, which uniquely identifies the cellular phone terminal. Once the user is authenticated, packets transmitted from the IP address, which is temporarily provided for the cellular phone terminal, will be transmitted to the communication control apparatus 10 and processed therein, without being authenticated by the connection management server 120 during a certain period. The message output server 130 outputs a message to the destination or the source of an access request, according to whether the communication control apparatus 10 has permitted the access. The log management server 140 manages the operating history of the communication control apparatus 10. The database server 150 acquires the latest database from a URL database 160 and provides the database to the communication control apparatus 10. To update the database without halting the operation of the communication control apparatus 10, the apparatus may possess a backup database. The operation monitoring server 110 monitors the operating status of the communication control apparatus 10 and its peripheral apparatuses including the connection management server 120, message output server 130, log management server 140 and database server 150. The operation monitoring server 110 has the highest priority in the communication control system 100 and performs supervisory control of the communication control apparatus 10 and all the peripheral apparatuses. The communication control apparatus 10 is configured with a dedicated hardware circuit, as will be described later. By inputting to or outputting from the communication control apparatus 10 the data for monitoring by means of a boundary-scan circuit, based on the technique described in Japanese Patent No. 3041340 filed by the present applicant or other techniques, the operation monitoring server 110 can monitor the operating status even while the communication control apparatus 10 is in operation.

In the communication control system 100 of the present embodiment, as will be described below, the communication control apparatus 10, configured with a dedicated hardware circuit for faster operation, is controlled by using a group of peripheral servers connected thereto and having various functions. Accordingly, by suitably replacing the software of the group of servers, a wide variety of functions can be achieved with a similar configuration. Thus, the present embodiment provides such communication control system having high flexibility.

In the following, a general description of the communication control apparatus 10 will be provided before a URL filtering technique, which is distinctive in the present embodiment, will be described.

Figure 2:
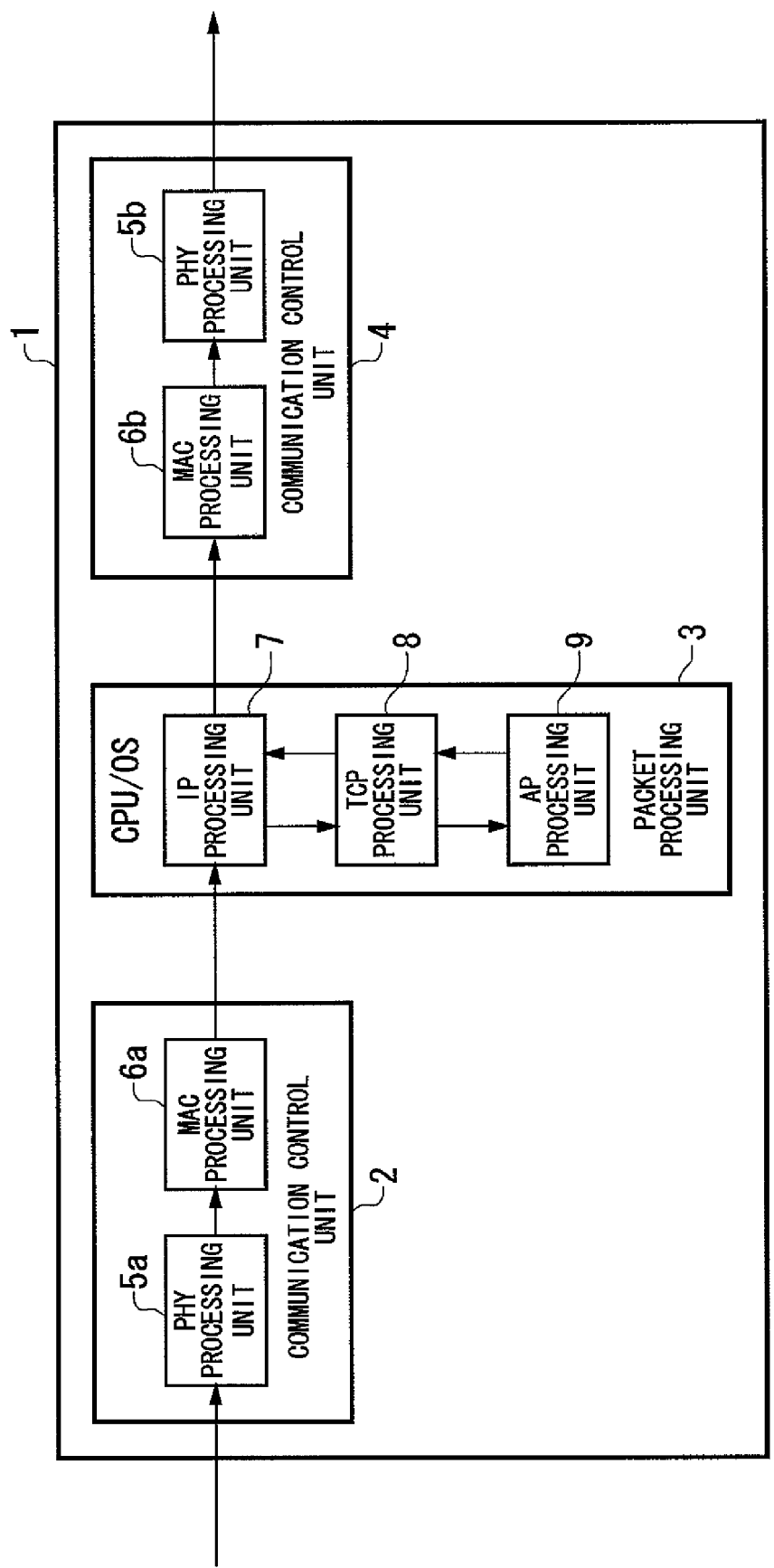
FIG. 2 is a diagram that shows a configuration of a conventional communication control apparatus.

FIG. 2 shows a configuration of a conventional communication control apparatus 1. The conventional communication control apparatus 1 comprises a communication control unit 2 on the receiving side, a packet processing unit 3, and a communication control unit 4 on the sending side. The communication control units 2 and 4 include PHY processing units 5a and 5b for performing physical layer processing of packets, and MAC processing units 6a and 6b for performing MAC layer processing of packets, respectively. The packet processing unit 3 includes protocol processing units for performing protocol-specific processing, such as an IP processing unit 7 for performing IP (Internet Protocol) processing and a TCP processing unit 8 for performing TCP (Transport Control Protocol) processing. The packet processing unit 3 also includes an AP processing unit 9 for performing application layer processing. The AP processing unit 9 performs filtering or other processing according to data included in a packet.

The packet processing unit 3 of the conventional communication control apparatus 1 is implemented by software, using a general-purpose processor, or CPU, and an OS running on the CPU. With such configuration, however, the performance of the communication control apparatus 1 depends on the performance of the CPU, hampering the creation of a communication control apparatus capable of high-speed processing of a large volume of packets. For example, a 64-bit CPU can process only up to 64 bits at a time, and hence, there has existed no communication control apparatus having a higher performance than this. In addition, since the conventional communication control apparatus is predicated on the presence of an OS with versatile functionality, the possibility of security holes cannot be eliminated completely, requiring maintenance work including OS upgrades.

Figure 3:
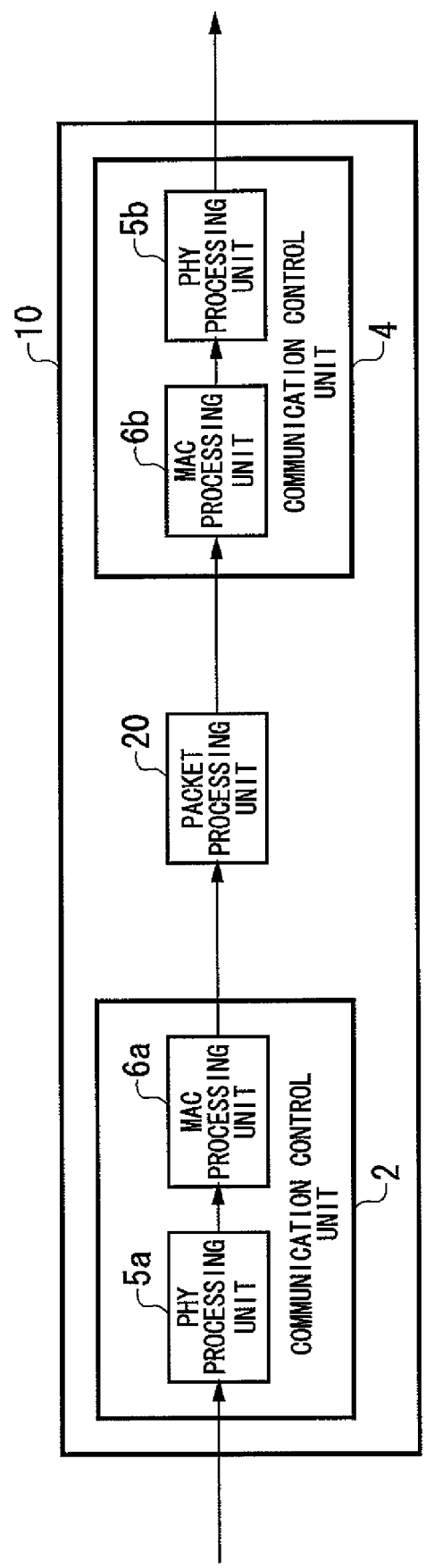
FIG. 3 is a diagram that shows a configuration of a communication control apparatus according to the embodiment.

FIG. 3 shows a configuration of a communication control apparatus in the present embodiment. The communication control apparatus 10 comprises a packet processing circuit 20 configured with dedicated hardware employing a wired logic circuit, instead of the packet processing unit 3 implemented by software including a CPU and an OS in the conventional communication control apparatus 1 shown in FIG. 2. By providing a dedicated hardware circuit to process communication data, rather than processing it with an OS and software running on a general-purpose processing circuit such as CPU, the performance limitations posed by the CPU or OS can be overcome, enabling a communication control apparatus having high throughput.

For example, a case will be considered here in which, in packet filtering or the like, a search is conducted to check if the data in a packet includes reference data, which serves as criteria for filtering. When a CPU is used to compare the communication data with the reference data, there occurs a problem in that, since only 64-bit data can be compared at a time, the processing speed cannot be improved beyond such CPU performance. Since the CPU needs to repeat the process of loading 64 bits of communication data into a memory and comparing it with the reference data, the memory load time becomes a bottleneck which limits the processing speed.

In the present embodiment, by contrast, a dedicated hardware circuit configured with a wired logic circuit is provided to compare communication data with reference data. This circuit includes multiple comparators arranged in parallel, so as to enable the comparison of data having a length greater than 64 bits, such as 1024 bits. By providing dedicated hardware in such manner, bit matching can be simultaneously performed on a large number of bits in parallel. Since 1024-bit data can be processed at a time, while the conventional communication control apparatus 1 using a CPU processes only 64 bits, the processing speed can be improved remarkably. Increasing the number of comparators will improve the throughput, but also increase the cost and size of the apparatus. Accordingly, an optimal hardware circuit may be designed in accordance with the desired performance, cost or size. The dedicated hardware circuit may be configured using FPGA (Field Programmable Gate Array), etc.

Since the communication control apparatus 10 of the present embodiment is configured with dedicated hardware employing a wired logic circuit, it does not require any OS (Operating System). This can eliminate the need for the installation, bug fixes, or version upgrades of an OS, thereby reducing the cost and man-hours required for administration and maintenance. Also, unlike CPUs requiring versatile functionality, the communication control apparatus 10 does not include any unnecessary functions or use needless resources, and hence, reduced cost, a smaller circuit area or improved processing speed can be expected. Furthermore, again unlike conventional OS-based communication control apparatuses, the absence of unnecessary functions decreases the possibility of security holes and thus enhances the tolerance against attacks from malicious third parties over a network.

Figure 4:
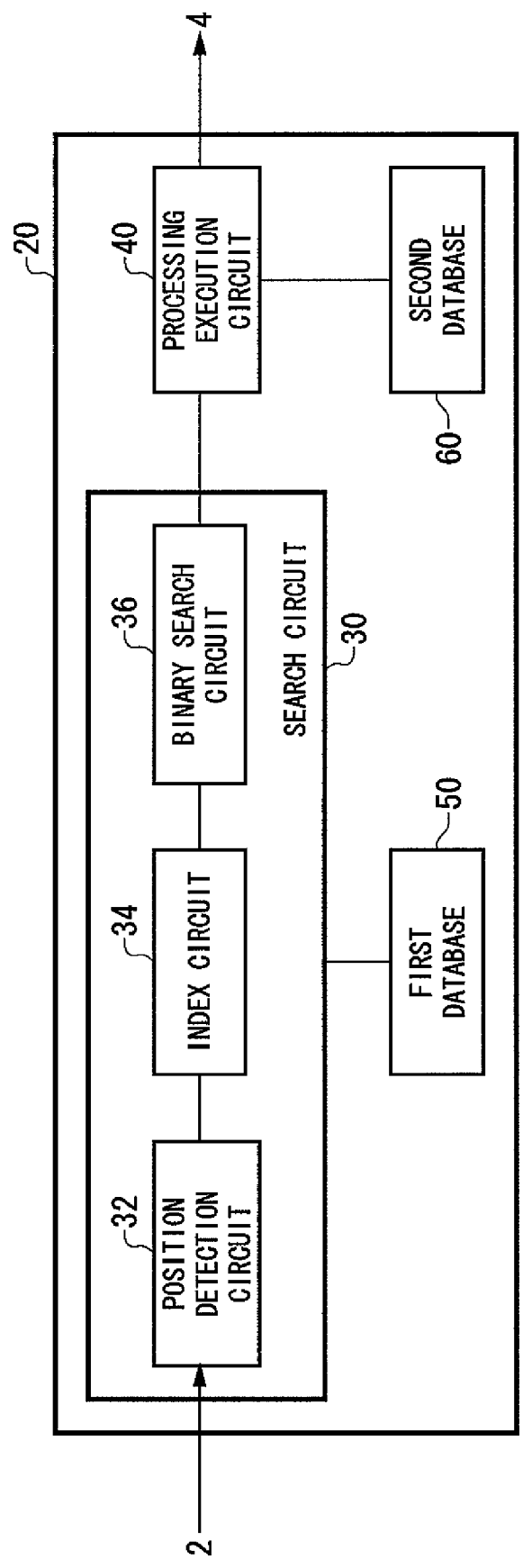
FIG. 4 is a diagram that shows an internal configuration of a packet processing circuit.

FIG. 4 shows an internal configuration of the packet processing circuit. The packet processing circuit 20 comprises: a first database 50 for storing reference data to be referred to when determining processing to be performed on communication data; a search circuit 30 for searching received communication data for the reference data by comparing the two; a second database 60 for storing a search result of the search circuit 30 and a content of processing to be performed on the communication data, which are related to each other; and a process execution circuit 40 for processing the communication data based on the search result of the search circuit 30 and the conditions stored in the second database 60.

The search circuit 30 includes: a position detection circuit 32 for detecting the position of comparison target data, which is to be compared with reference data, in communication data; an index circuit 34 which serves as an example of a determination circuit for determining which range the comparison target data belongs to, among three or more ranges into which the reference data stored in the first database 50 is divided; and a binary search circuit 36 for searching the determined range for the reference data that matches the comparison target data. The reference data may be searched for the comparison target data using any search technique, and a binary search method is used in the present embodiment.

Figure 5:
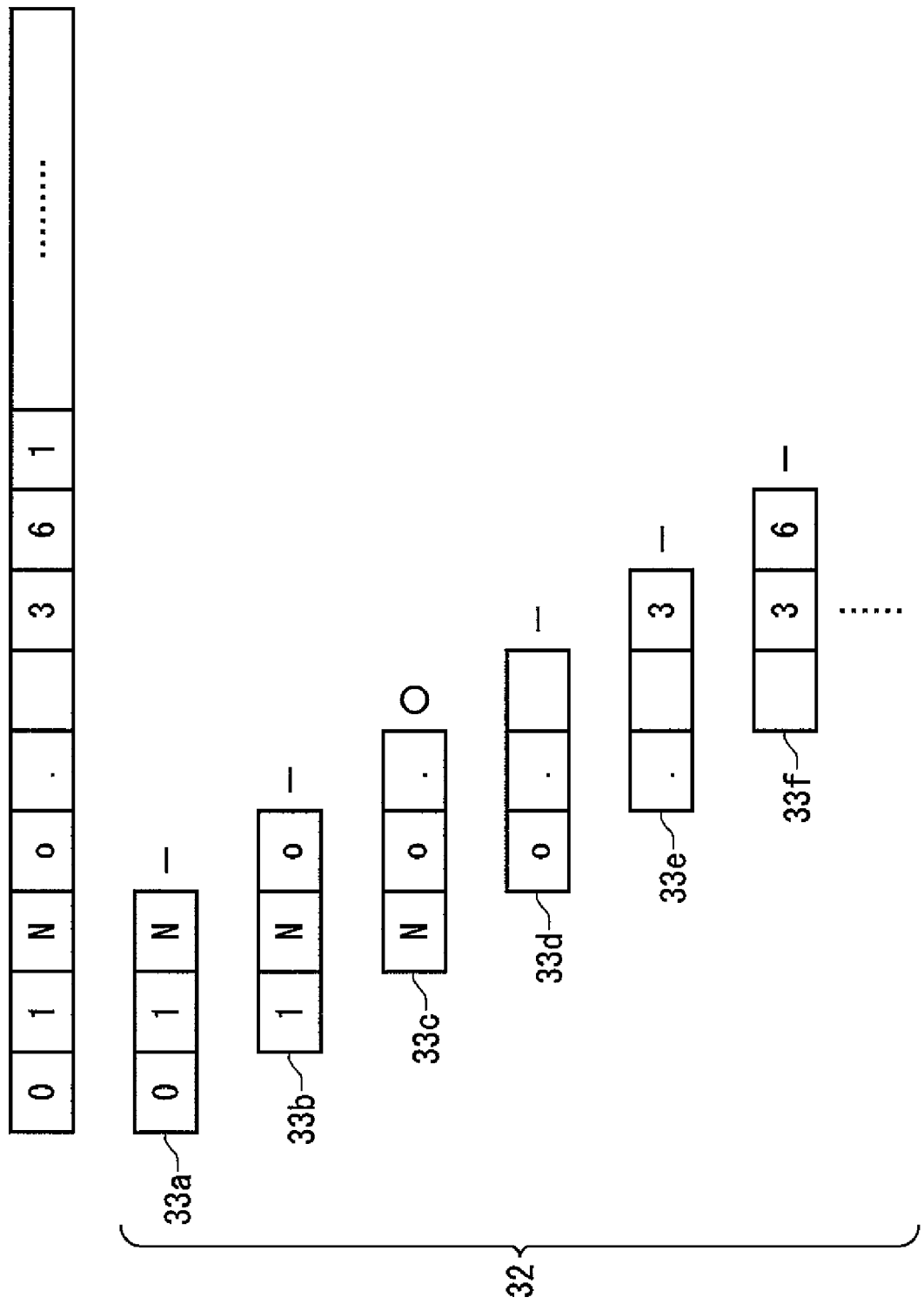
FIG. 5 is a diagram that shows an internal configuration of a position detection circuit.

FIG. 5 shows an internal configuration of the position detection circuit. The position detection circuit 32 includes multiple comparison circuits 33a-33f which compare communication data with position identification data for identifying the position of comparison target data. While six comparison circuits 33a-33f are provided here, the number of comparison circuits may be arbitrary, as will be described later. To the comparison circuits 33a-33f are input pieces of communication data, with each piece shifted from the preceding one by a predetermined data length, such as 1 byte. These multiple comparison circuits 33a-33f then simultaneously compare the communication data with the position identification data to be detected in parallel.

The present embodiment will be described by way of example for explaining the operation of the communication control apparatus 10, in which a character string "No. ###" in communication data is detected, the number "###" included in the character string is then compared with reference data, and if the number matches the reference data, the packet will be allowed to pass, while, if they do not match, the packet will be discarded.

In the example of FIG. 5, communication data "01No. 361 . . . " is input to the comparison circuits $33a$-$33f$ with a shift of one character each, and position identification data "No." for identifying the position of the number "###" is sought to be detected in the communication data. More specifically, "01N" is input to the comparison circuit $33a$, "1No" to the comparison circuit $33b$, "No." to the comparison circuit $33c$, "o." to the comparison circuit $33d$, ". 3" to the comparison circuit $33e$, and "36" to the comparison circuit $33f$. Then, the comparison circuits $33a$-$33f$ simultaneously perform comparisons with the position identification data "No.". Consequently, there is found a match with the comparison circuit $33c$, indicating that the character string "No." exists at the third character from the top of the communication data. Thus, it is determined that the numeral data as comparison target data exists subsequent to the position identification data "No." detected by the position detection circuit 32.

When the same processing is performed by a CPU, since the comparison process needs to be serially performed one by one from the top, such as comparing character strings "01N" and "No." before comparing "1No" and "No.", no improvement of detection speed can be expected. In the communication control apparatus 10 of the present embodiment, in contrast, providing the multiple comparison circuits $33a$-$33f$ in parallel enables simultaneous parallel comparison processing, which could not have been performed by a CPU, improving the processing speed significantly. Providing more comparison circuits will improve the detection speed, as more characters can be compared simultaneously. In consideration of cost or size, a sufficient number of comparison circuits may be provided to achieve a desired detection speed.

Aside from detecting position identification data, the position detection circuit 32 may also be used as a circuit for detecting character strings for various purposes. Moreover, the position detection circuit 32 may be configured to detect position identification data in units of bits, not just as a character string.

Figure 6:
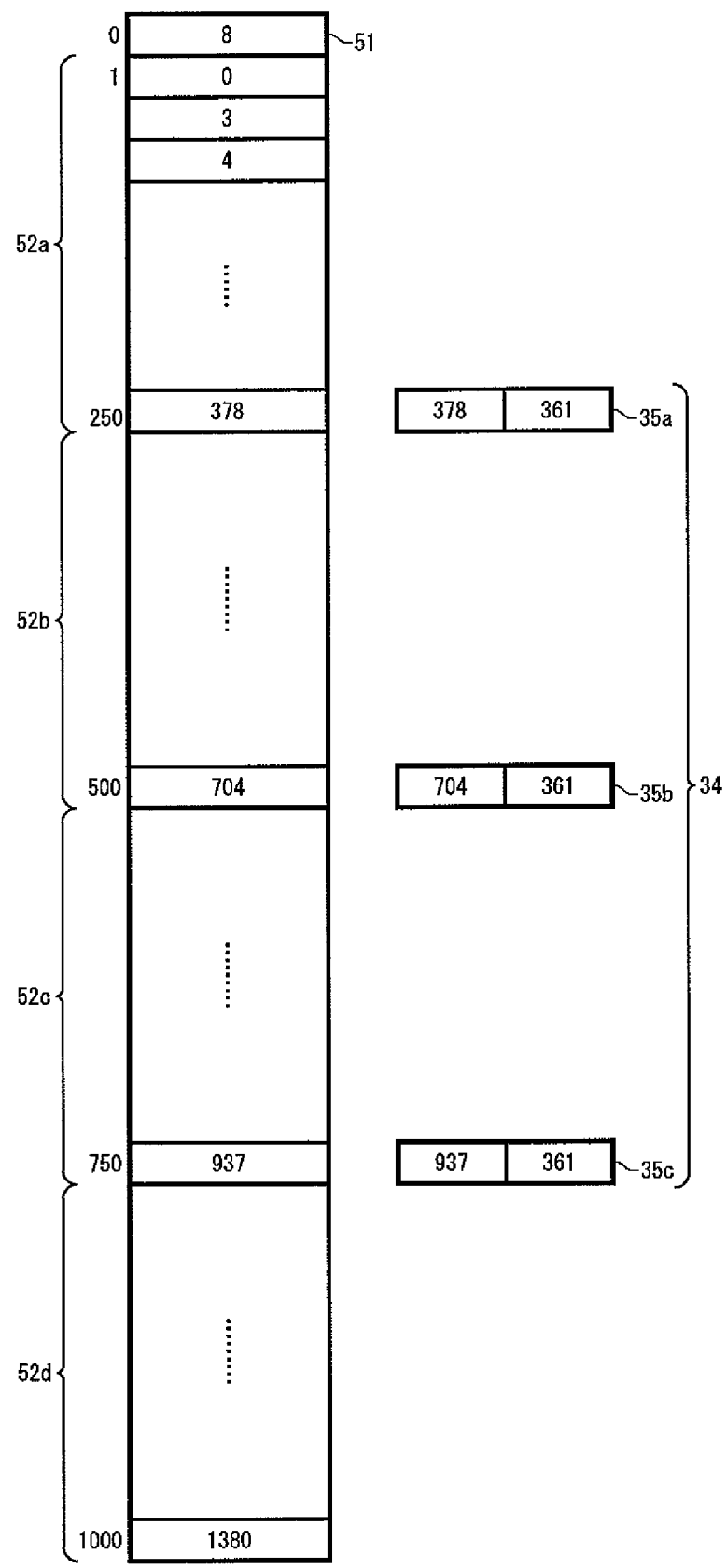
FIG. 6 is a diagram that shows an example of internal data of a first database.

FIG. 6 shows an example of internal data of the first database. The first database 50 stores reference data to be referred to when determining the processing on packets, such as filtering, routing, switching, and replacement. The pieces of reference data are sorted according to some sort conditions. In the example of FIG. 6, 1000 pieces of reference data are stored.

The top record of the first database 50 contains an offset 51 which indicates the position of comparison target data in communication data. For example, in a TCP packet, the data configuration within the packet is determined in units of bits. Therefore, if the position of flag information or the like for determining the processing on the packet is given in the form of the offset 51, the processing can be determined by comparing only necessary bits, thus improving the processing efficiency. Also, even when the configuration of packet data is changed, it can be settled by modifying the offset 51 accordingly. The first database 50 may store the data length of comparison target data. In this case, since the comparison can be performed by operating only a required number of comparators, the search efficiency can be improved.

The index circuit 34 determines which range the comparison target data belongs to, among three or more ranges, such as $52a$-$52d$, into which reference data stored in the first database 50 is divided. In the example of FIG. 6, the 1000 pieces of reference data are divided into four ranges $52a$-$52d$, i.e., 250 pieces each. The index circuit 34 includes multiple comparison circuits $35a$-$35c$, each of which compares a piece of reference data at the border of the range with the comparison target data. Since the comparison circuits $35a$-$35c$ simultaneously compare the pieces of reference data at the borders with the comparison target data in parallel, which range the comparison target data belongs to can be determined by a single operation of comparison processing.

As mentioned previously, CPU-based binary search cannot make multiple comparisons at the same time. In the communication control apparatus 10 of the present embodiment, in contrast, providing the multiple comparison circuits $35a$-$35c$ in parallel enables simultaneous parallel comparison processing, with a significant improvement in the search speed.

After the index circuit 34 determines the relevant range, the binary search circuit 36 performs a search using a binary search method. The binary search circuit 36 divides the range determined by the index circuit 34 further into two and subsequently compares the piece of reference data lying at the border with the comparison target data, thereby determining which range the comparison target data belongs to. The binary search circuit 36 includes multiple comparison circuits for comparing, bit by bit, reference data with comparison target data. For example, in the present embodiment are provided 1024 comparison circuits to perform bit matching on 1024 bits simultaneously. When the range to which the comparison target data belongs is determined between the two split ranges, the determined range is further divided into two. Then, the reference data lying at the border is read out to be compared with the comparison target data. Thereafter, this processing is repeated to narrow the range further until reference data that matches the comparison target data is eventually found.

The operation will now be described in more detail in conjunction with the foregoing example. In the communication data shown in FIG. 5, the number "361" is the comparison target data that follows the position identification data "No.". Since a single space character intervenes between the position identification data "No." and the comparison target data "361", the offset 51 is set to "8" bits in order to exclude the space from the comparison target data. Accordingly, the binary search circuit 36 skips the first "8" bits, or 1 byte, of the communication data subsequent to the position identification data "No." and reads the following "361" as the comparison target data.

Each of the comparison circuits $35a$-$35c$ of the index circuit 34 receives "361" as comparison target data. As for reference data, the comparison circuit $35a$ receives "378", which lies at the border of the ranges $52a$ and $52b$. Similarly, the comparison circuit $35b$ receives reference data "704" lying at the border of the ranges $52b$ and $52c$, and the comparison circuit $35c$ receives reference data "937" lying at the border of the ranges $52c$ and $52d$. The comparison circuits $35a$-$35c$ then perform comparisons simultaneously, determining that the comparison target data "361" belongs to the range $52a$. Subsequently, the binary search circuit 36 searches the reference data for the comparison target data "361".

Figure 7:
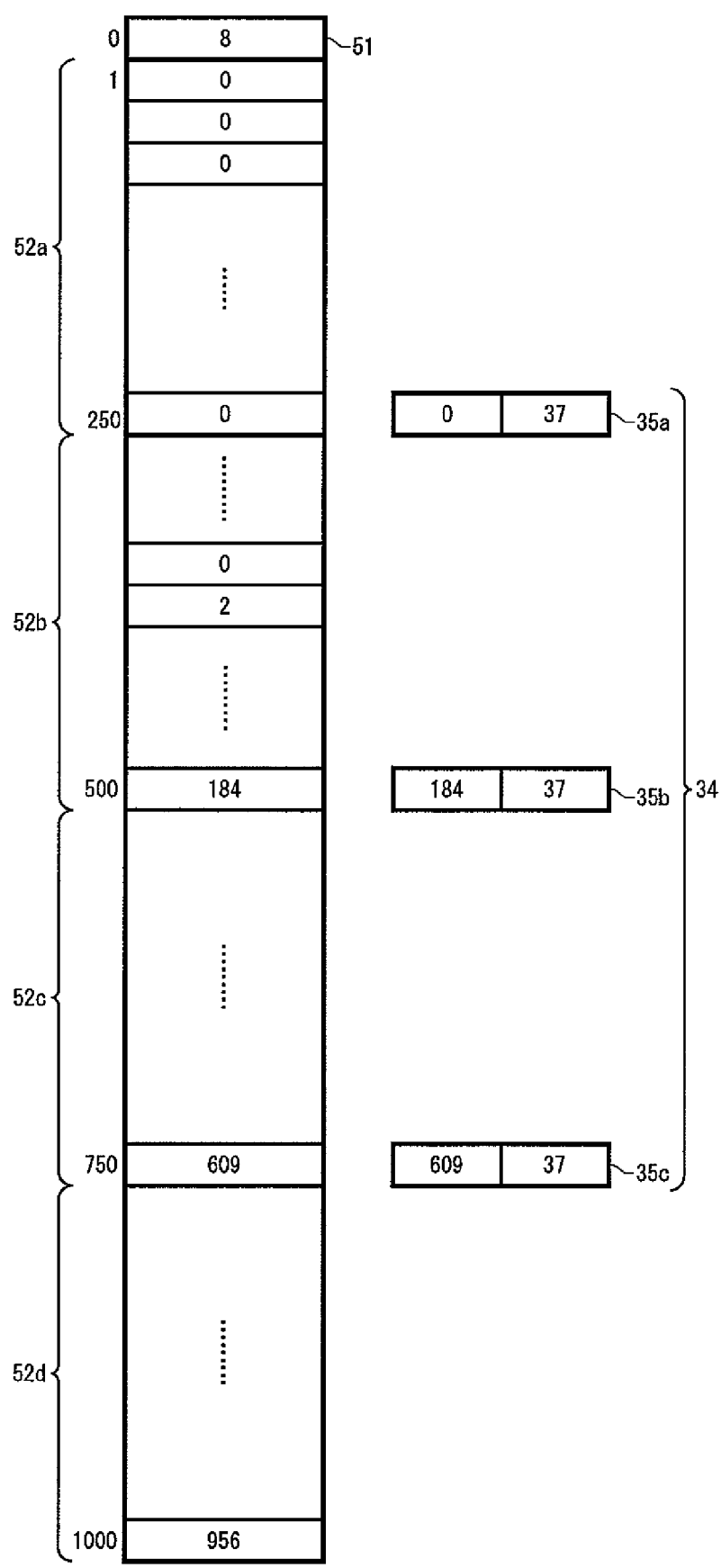
FIG. 7 is a diagram that shows another example of internal data of the first database.

FIG. 7 shows another example of internal data of the first database. In the example shown in FIG. 7, the number of pieces of reference data is smaller than the number of pieces of data storable in the first database 50, i.e., 1000 in this case. In such instance, the first database 50 stores the pieces of reference data in descending order, starting with the last data position therein. Then, 0 is stored in the rest of the data positions. The database is loaded with data not from the top but from the bottom of the loading area, and all the vacancies occurring in the front of the loading area, if any, are replaced with zero. Consequently, the database is fully loaded at any time, so that the maximum time necessary for a binary search will be constant. Moreover, if the binary search circuit 36 reads reference data "0" during a search, the circuit can identify the range without making a comparison, as the comparison result is obvious, and can proceed to the next comparison. Consequently, the search speed can be improved.

In CPU-based software processing, the first database 50 stores pieces of reference data in ascending order, from the first data position therein. In the rest of data positions will be stored a maximum value or the like, and in such case, the skip of comparison processing as described above cannot be made during a binary search. The comparison technique described above can be implemented by configuring the search circuit 30 with a dedicated hardware circuit.

Figure 8:
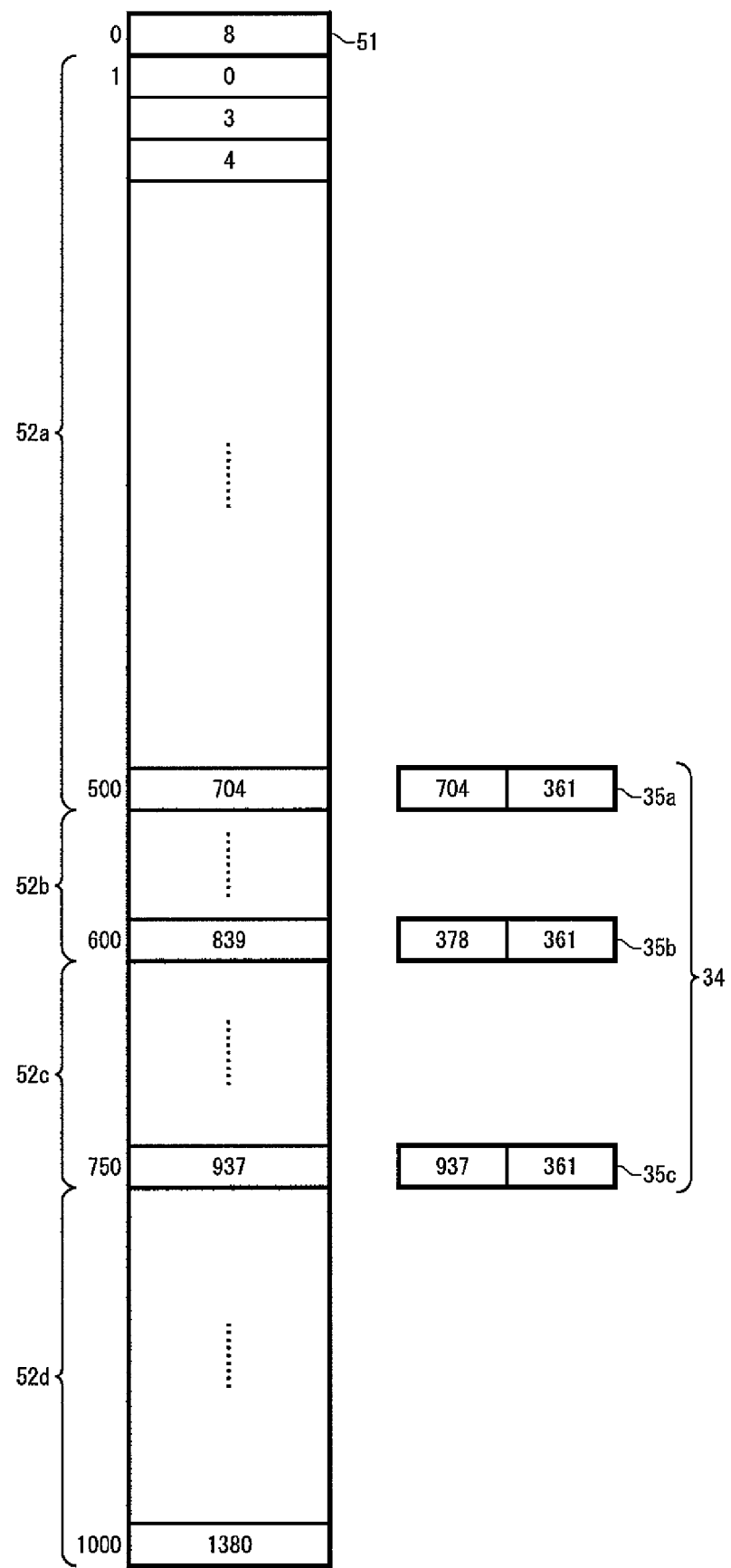
FIG. 8 is a diagram that shows yet another example of internal data of the first database.

FIG. 8 shows yet another example of internal data of the first database. In the example shown in FIG. 8, the reference data is not evenly divided into three or more ranges, but unevenly divided into ranges that accommodate different numbers of pieces of data, such as 500 pieces in the range 52a and 100 pieces in the range 52b. These ranges may be determined depending on the distribution of frequencies with which reference data occurs in communication data. Specifically, the ranges may be determined so that the sums of the frequencies of occurrence of reference data belonging to the respective ranges are almost the same. Accordingly, the search efficiency can be improved. The reference data to be input to the comparison circuits 35a-35c of the index circuit 34 may be modifiable from the outside. In such case, the ranges can be dynamically set, so that the search efficiency will be optimized.

Figure 9:
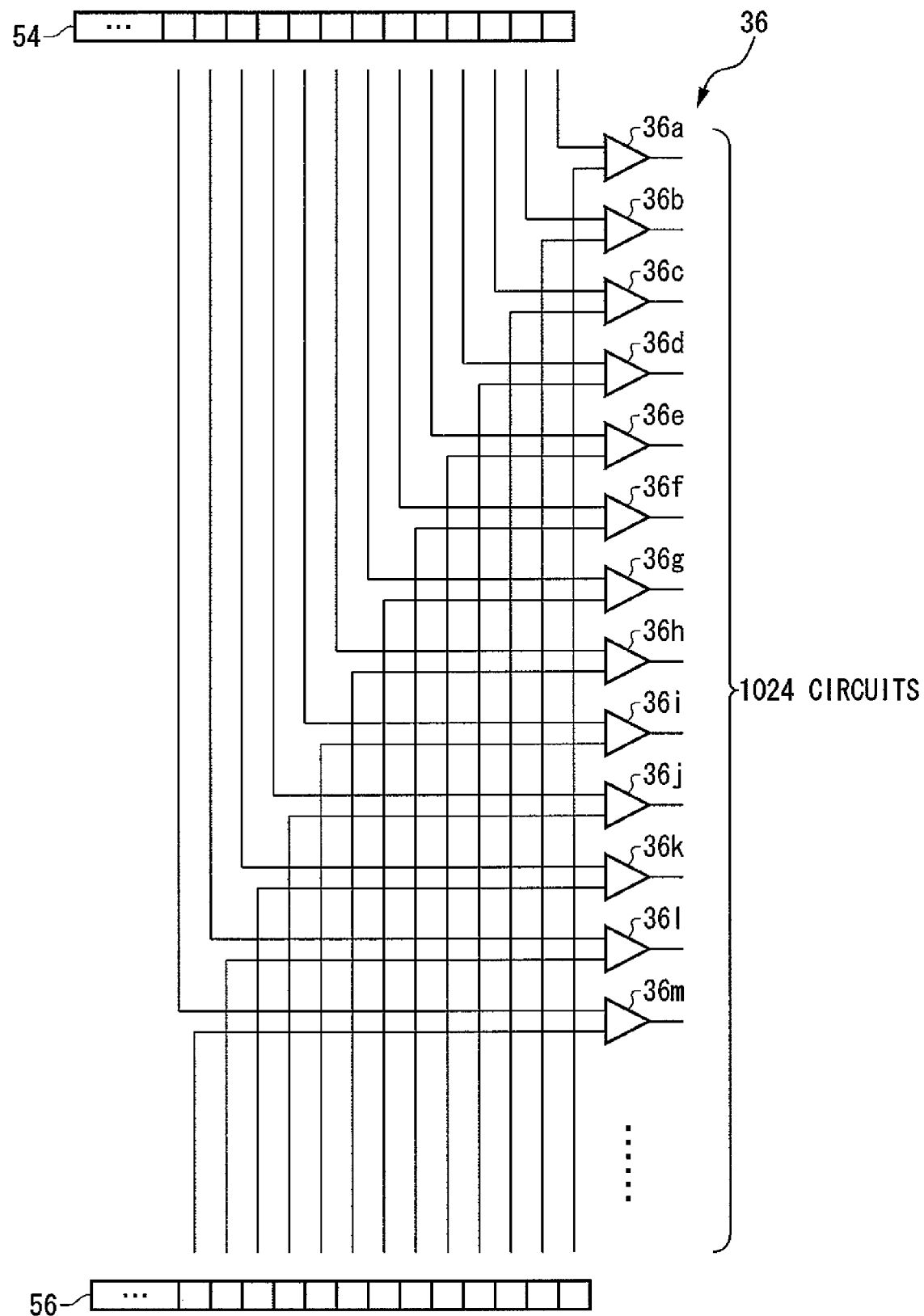
FIG. 9 is a diagram that shows a configuration of comparison circuits included in a binary search circuit.

FIG. 9 shows a configuration of comparison circuits included in the binary search circuit. As mentioned previously, the binary search circuit 36 includes 1024 comparison circuits, such as 36a, 36b, . . . . Each of the comparison circuits 36a, 36b, etc. receives 1 bit of reference data 54 and 1 bit of comparison target data 56 to compare the bits in value. The comparison circuits 35a-35c of the index circuit 34 have similar internal configurations. Since the comparison processing is thus performed by a dedicated hardware circuit, a large number of comparison circuits can be operated in parallel to compare a large number of bits at a time, thereby speeding up the comparison processing.

FIG. 10 shows an example of internal data of the second database. The second database 60 includes a search result field 62, which contains a search result of the search circuit 30, and a processing content field 64, which contains a processing content to be performed on communication data. The database stores the search results and the processing contents related to each other. In the example of FIG. 10, conditions are established such that a packet will be allowed to pass if its communication data contains reference data; if not, the packet will be discarded. The process execution circuit 40 searches the second database 60 for a processing content based on the search result and performs the processing on the communication data. The process execution circuit 40 may also be configured with a wired logic circuit.

FIG. 11 shows another example of internal data of the second database. In the example of FIG. 11, the processing content is set for each piece of reference data. With regard to packet replacement, replacement data may be stored in the second database 60. As for packet routing or switching, information on the route may be stored in the second database 60. The process execution circuit 40 performs processing, such as filtering, routing, switching, or replacement, which is specified in the second database 60, in accordance with the search result of the search circuit 30. When the processing content is set for each piece of reference data, as shown in FIG. 11, the first database 50 and the second database 60 may be merged with each other.

The first database and the second database are configured to be rewritable from the outside. By replacing these databases, various types of data processing and communication control can be achieved using the same communication control apparatus 10. Also, multistage search processing may be performed by providing two or more databases that store reference data to be searched. In such instance, more complicated conditional branching may be performed by providing two or more databases that store search results and processing contents related to each other. When multiple databases are thus provided to conduct multistage search, a plurality of the position detection circuits 32, the index circuits 34, the binary search circuits 36, etc. may also be provided.

The data intended for the foregoing comparison may be compressed by the same compression logic. If both the source data and the target data to be compared are compressed by the same method, the comparison can be performed in the same manner as usual, thus reducing the amount of data to be loaded for comparison. The smaller amount of data to be loaded can reduce the time required to read out the data from the memory, thereby reducing the overall processing time. Moreover, the number of comparators can be also reduced, which contributes to the miniaturization, weight saving, and cost reduction of the apparatus. The data intended for comparison may be stored in a compressed form, or may be read out from the memory and compressed before comparison.

For the data processing apparatus stated above, the following aspects may be provided.

[Aspect 1]

A data processing apparatus comprising:

a first memory unit which contains reference data to be referred to when determining contents of processing to be performed on acquired data;

a search section which searches the data for the reference data by comparing the data and the reference data;

a second memory unit which stores a result of search obtained by the search section and the contents of processing in association with each other; and a processing section which performs the processing associated with the result of search on the data, based on the result of search, wherein the search section is composed of a wired logic circuit.

[Aspect 2]

The data processing apparatus of Aspect 1, wherein the wired logic circuit includes a plurality of first comparison circuits which compare the data with the reference data bit by bit.

[Aspect 3]

The data processing apparatus of Aspect 1, wherein the search section includes a position detection circuit which detects in the data a position of comparison target data to be compared with the reference data.

[Aspect 4]

The data processing apparatus of Aspect 3, wherein the position detection circuit includes a plurality of second comparison circuits which compare the data with position identification data for identifying the position of the comparison target data, and wherein the plurality of second comparison circuits receive the data, each having a shift of a predetermined data length, and compare the data with the position identification data simultaneously in parallel.

[Aspect 5]

The data processing apparatus of Aspect 1 or 2, wherein the search section includes a binary search circuit which searches the data for the reference data by binary search.

[Aspect 6]

The data processing apparatus of Aspect 5, wherein, when the number of pieces of the reference data is smaller than the number of pieces of data storable in the first memory unit, the reference data is stored in the first memory unit in descending order from the last data position, while 0 is stored in the rest of the data.

[Aspect 7]

The data processing apparatus of any one of Aspects 1 to 6, wherein the search section includes a determination circuit which determines which range the comparison target data to be compared with the reference data pertains to, out of three or more ranges into which the plurality of pieces of reference data stored in the first memory unit are divided.

[Aspect 8]

The data processing apparatus of Aspect 7, wherein the determination circuit include a plurality of third comparison circuits which compare reference data at borders of the ranges with the comparison target data so that the plurality of third comparison circuits determine which of the three or more ranges the comparison target data pertains to simultaneously in parallel.

[Aspect 9]

The data processing apparatus of Aspect 7 or 8, wherein the ranges are determined depending on a distribution of frequencies of occurrence of the reference data in the data.

[Aspect 10]

The data processing apparatus of any one of Aspects 1 to 9, wherein the first memory unit further contains information that indicates the position of the comparison target data in the data, and wherein the search section extracts the comparison target data based on the position-indicating information.

[Aspect 11]

The data processing apparatus of any one of Aspects 1 to 10, wherein the first memory unit or the second memory unit is configured to be rewritable from the outside.

Next, a URL filtering technique using the communication control apparatus 10 discussed above will be described.

Figure 12:
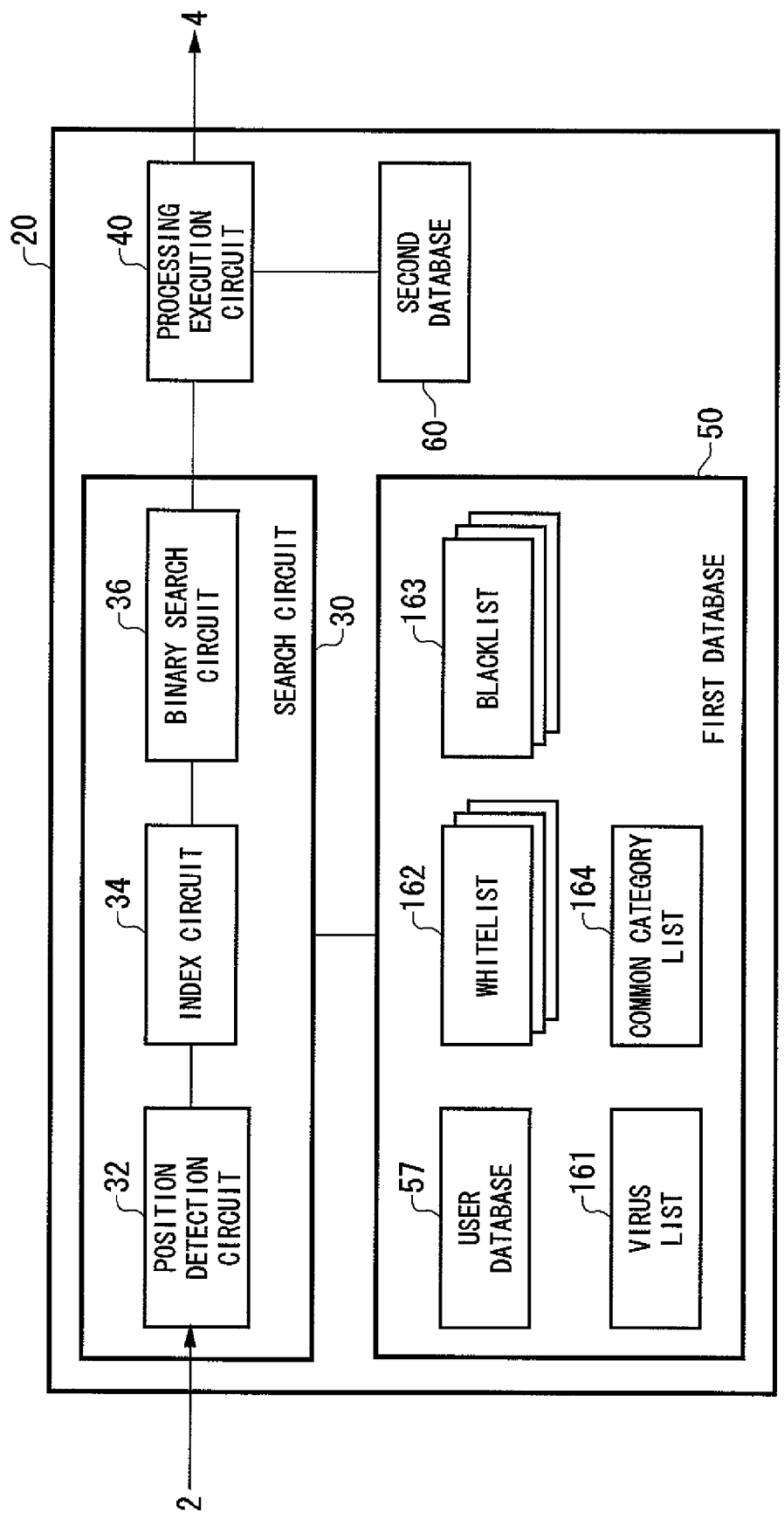
FIG. 12 is a diagram that shows an internal configuration of the packet processing circuit according to the embodiment.

FIG. 12 shows an internal configuration of the packet processing circuit 20 in the present embodiment. The packet processing circuit 20 of the present embodiment comprises, as the first database 50, a user database 57, a virus list 161, a whitelist 162, a blacklist 163 and a common category list 164. The user database 57 stores information on users who use the communication control apparatus 10. The communication control apparatus 10 receives, from a user, information for identifying the user, and performs matching between the information received by the search circuit 30 therein and the user database 57 to authenticate the user. For the user-identifying information, a source address stored in the IP header of a TCP/IP packet, or a user ID and a password provided by a user may be used. In the former case, storage location of a source address in a packet is already known. Accordingly, when the search circuit 30 performs matching with the user database 57, the position detection circuit 32 needs not to detect the position, and the only thing required there is to specify, as the offset 51, the storage location of the source address. After the user is authenticated as a user registered in the user database 57, the URL of a content is checked against the virus list 161, whitelist 162, blacklist 163 and common category list 164, in order to determine whether or not the access to the content should be permitted. The whitelist 162 and blacklist 163 are provided for each user, and when a user ID is uniquely specified after the user authentication, the whitelist 162 and blacklist 163 for the user is provided to the search circuit 30.

The virus list 161 contains a list of URLs of contents containing computer viruses. If a URL is contained in the virus list 161, the request for access to the content having such URL will be denied. The whitelist 162 is provided for each user and contains a list of URLs of contents to which access is permitted. The blacklist 163 is also provided for each user but contains a list of URLs of contents to which access is prohibited. FIG. 13A shows an example of internal data of the virus list 161. Similarly, FIG. 13B shows an example of internal data of the whitelist 162, and FIG. 13C shows that of the blacklist 163. Each of the virus list 161, whitelist 162 and blacklist 163 contains a category number field 165, a URL field 166 and a title field 167. The URL field 166 contains a URL of a content to which access is permitted or prohibited. The category number field 165 contains a category number of a content. The title field 167 contains a title of a content.

The common category list 164 contains a list for classifying contents represented by URLs into multiple categories. FIG. 14 shows an example of internal data of the common category list 164. The common category list 164 also contains the category number field 165, URL field 166 and title field 167.

The communication control apparatus 10 extracts a URL included in a "GET" request message and searches the virus list 161, whitelist 162, blacklist 163 and common category list 164 for the URL using the search circuit 30. At this time, a character string "http://", for example, may be detected by the position detection circuit 32 so as to extract the subsequent data string as target data. Then, the index circuit 34 and binary search circuit 36 perform matching between the extracted URL and the reference data in the virus list 161, whitelist 162, blacklist 163 and common category list 164.

FIGS. 15A, 15B, 15C and 15D show examples of internal data of the second database 60 in the present embodiment. FIG. 15A shows the search result and processing content with respect to the virus list 161. If a URL included in a GET request matches a URL included in the virus list 161, the access to the URL will be prohibited. FIG. 15B shows the search result and processing content with respect to the whitelist 162. If a URL included in a GET request matches a URL included in the whitelist 162, the access to the URL will be permitted. FIG. 15C shows the search result and processing content with respect to the blacklist 163. If a URL included in a GET request matches a URL included in the blacklist 163, the access to the URL will be prohibited.

FIG. 15D shows the search result and processing content with respect to the common category list 164. As shown in FIG. 15D, a user can determine, with respect to each of the categories, the permission or prohibition of the access to contents belonging to the category, in relation to the results of search through the common category list 164. The second database 60 for the common category list 164 contains a user ID field 168 and a category field 169. The user ID field 168 contains an ID for identifying a user. The category field 169 contains information that indicates the permission or prohibition of the access to contents belonging to respective categories, which is determined by a user for each of 57 categories classified. If a URL included in a GET request matches a URL included in the common category list 164, the permission for the access to the URL will be determined according to the category that the URL belongs to and the user ID. Although the number of common categories is 57 in FIG. 15D, it is not limited thereto.

Figure 16:
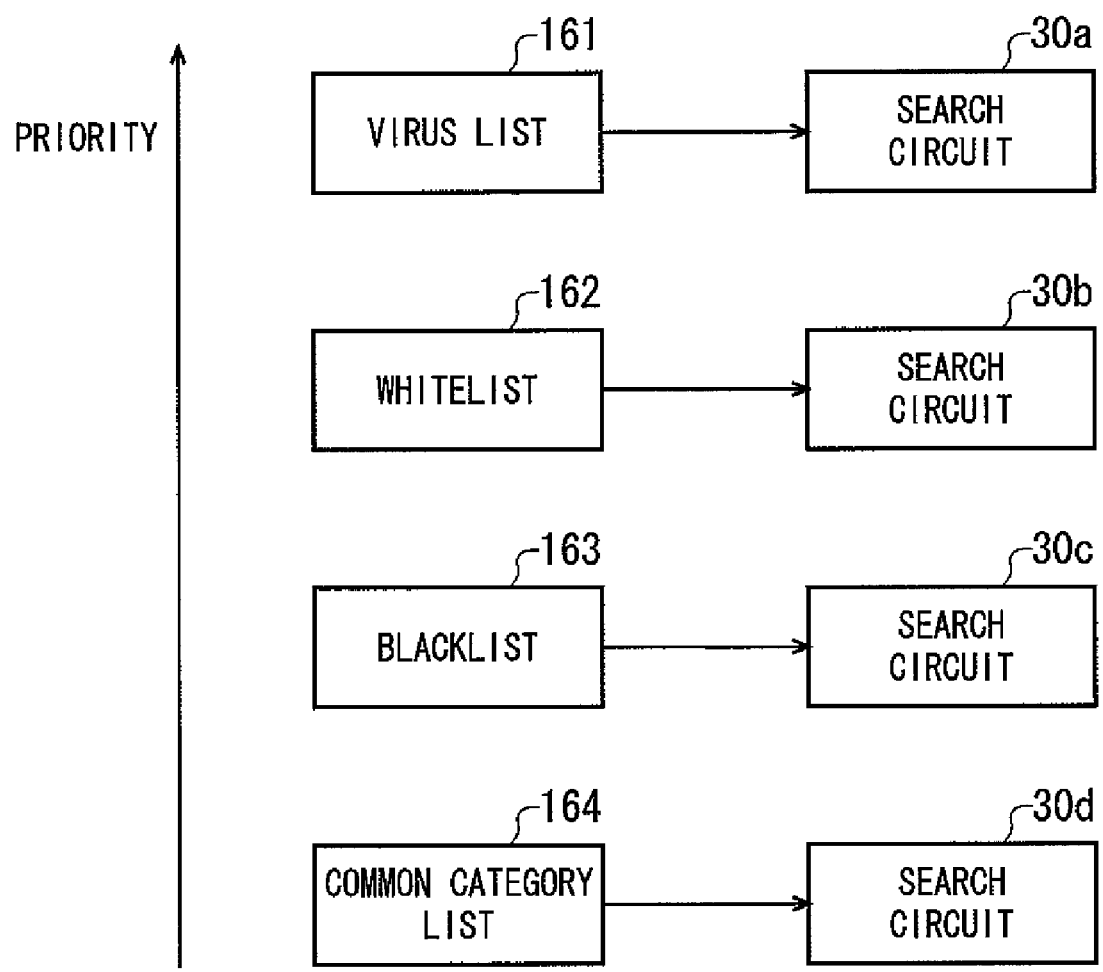
FIG. 16 is a diagram that shows the priorities of the virus list, whitelist, blacklist and common category list.

FIG. 16 shows the priorities of the virus list 161, whitelist 162, blacklist 163 and common category list 164. In the present embodiment, the virus list 161, whitelist 162, blacklist 163 and common category list 164 have higher priorities in this order. For example, even though a URL of a content appears in the whitelist 162 and the access thereto is permitted, the access will be prohibited if the URL also appears in the virus list 161, as it is determined that the content contains a computer virus.

When conventional software-based matching is performed in consideration of such priorities, the matching is performed on the lists, for example, in descending order of priority and the first match is employed. Alternatively, the matching is performed on lists in ascending order of priority, and the latest match is employed to replace the preceding match. In the present embodiment using the communication control apparatus 10 configured with a dedicated hardware circuit, in contrast, there are provided a search circuit 30a for performing matching with respect to the virus list 161, a search circuit 30b for performing matching with respect to the whitelist 162, a search circuit 30c for performing matching with respect to the blacklist 163, and a search circuit 30d for performing matching with respect to the common category list 164; these search circuits 30 perform matching simultaneously in parallel. When matches are found in multiple lists, the one with the highest priority is employed. Thus, even when multiple databases are provided and the priorities thereof are defined, the search time can be reduced remarkably.

The priorities of the virus list 161, whitelist 162, blacklist 163 and common category list 164, with which the permission of access is determined, may be provided in the second database 60, for example. The conditions in the second database 60 may be modified depending on the priorities of the lists.

When access to a content is permitted, the process execution circuit 40 outputs a signal to the message output server 130 to convey the permission. The message output server 130 then transmits a "GET" request message to the server retaining the content. When access to a content is prohibited, the process execution circuit 40 outputs a signal to the message output server 130 to convey the prohibition, and the message output server 130 then discards a "GET" request message for the server of access destination without transmitting it. At this time, a response message conveying the prohibition of the access may be transmitted to the request source. Alternatively, transfer to another web page may be forced. In this case, the process execution circuit 40 changes the destination address and URL to those of the transfer destination and transmits the "GET" request message. Information including such response message or URL of the transfer destination may be stored in the second database 60 or the like.

With the configuration and operation as described above, access to an inappropriate content can be prohibited. Also, since the search circuit 30 is a dedicated hardware circuit configured with FPGA, etc., high-speed search processing can be achieved, as discussed previously, and filtering process can be performed with minimal effect on the traffic. By providing such filtering service, an Internet service provider can provide added value, thus gaining more users.

The whitelist 162 or blacklist 163 may be mutually provided for all users.

The present invention has been described with reference to the embodiment. The embodiment is intended to be illustrative only and it will be obvious to those skilled in the art that various modifications to constituting elements or processes could be developed and that such modifications are also within the scope of the present invention.

INDUSTRIAL APPLICABILITY

The present invention is applicable to a communication control apparatus that controls access to contents.

The invention claimed is:

1. A communication control apparatus, comprising:
a memory unit which stores reference data to be referred to when determining the permission for access to a content stored in a position accessible via a network;
a search unit which acquires communication data for requesting access to the content and searches the communication data for the reference data; and
a processing unit which controls access to the content based on the result of the search, wherein:
the search unit is configured with a wired logic circuit,
the search unit comprises a determination circuit which determines which range comparison target data to be compared with the reference data pertains to, out of three or more ranges into which the plurality of pieces of reference data stored in the memory unit are divided, and
the determination circuit comprises a plurality of comparison circuits which compare reference data at borders of the ranges with the comparison target data so that the plurality of comparison circuits determine which of the three or more ranges the comparison target data pertains to simultaneously in parallel.

2. The communication control apparatus of claim 1, wherein the search unit searches, for the reference data, information indicating the position of a content to be accessed in the communication data.

3. The communication control apparatus of claim 1, wherein:
the memory unit includes a plurality of databases storing the reference data;
the search unit includes, with respect to each of a plurality of the databases, a search circuit which searches the communication data for the reference data stored in the database; and
a plurality of the search circuits perform searches on a plurality of the databases in parallel.

4. The communication control apparatus of claim 3, wherein:
priorities of the plurality of databases are defined; and,
when a plurality of the search circuits perform searches on a plurality of the databases in parallel and consequently a plurality of pieces of reference data included in a plurality of the databases are found, a search result with the highest priority is employed.

5. The communication control apparatus of claim 3, wherein the database stores data indicating the Position of a content to which access is permitted.

6. The communication control apparatus of claim 3, wherein the database stores data indicating the position of a content to which access is prohibited.

7. The communication control apparatus of claim 3, wherein the database stores data indicating the position of a content containing a computer virus to which access is prohibited.

8. The communication control apparatus of claim 3, wherein the database stores data in which the permission or prohibition of access to a content belonging to a category is determined by a user, with respect to each category.

9. A communication control system, comprising:
the communication control apparatus of claim 1; and
a server apparatus which is connected to the communication control apparatus and controls the operation of the communication control apparatus.

10. A communication control apparatus comprising:
a memory unit which stores reference data to be referred to when determining the permission for access to a content stored in a position accessible via a network;
a search unit which acquires communication data for requesting access to the content and searches the communication data for the reference data; and
a processing unit which controls access to the content based on the result of the search, wherein
the search unit is configured with a wired logic circuit, and
the search unit comprises a binary search circuit which searches the data for the reference data by binary search, and wherein, when the number of pieces of the reference data is smaller than the number of pieces of data storable in the memory unit, the reference data is stored in the memory unit in descending order from the last data position, while 0 is stored in the rest of the data.

* * * * *